United States Patent Office 3,046,209
Patented July 24, 1962

3,046,209
PREPARATION OF TRIPHENYLMETHANE DYES
Robert H. Sprague, Chagrin Falls, Ohio, assignor to Horizons Incorporated, Cleveland, Ohio, a corporation of New Jersey
No Drawing. Filed Jan. 12, 1961, Ser. No. 82,183
6 Claims. (Cl. 204—158)

This invention relates to a new process for forming substituted triphenylmethane dyes by a photolytic process which is simpler and more direct than presently known chemical processes for preparing such dyes. Many methods are known for the preparation of triphenylmethane dyes, but only a few of these have achieved industrial importance.

The classical approach includes first the preparation of the colorless leuco base, conversion of this to the carbinol base, and finally formation of the dye by treatment with acid. Usually this approach involves first the condensation of an aldehyde (which provides the central carbon atom of the final dye) with a tertiary aminobenzene in which the substituents on the amino nitrogen atom may be the same or different. The resulting leuco compound is oxidized to the carbinol base and this is then converted to the dye in the presence of acid. Other similar condensations are known using Michler's hydrol or Michler's ketone as the materials condensed with suitable arylamines.

In each of the known procedures, of the type described, there is required a careful control of the purity of the reagents and a careful control of the reaction conditions in order to produce dyes having the desired brilliance and uniformity of color. Furthermore, the chemicals utilized in such preparatory methods add to the expense of the process.

A principal object of this invention is to provide a process for preparing triphenylmethane dyes which utilizes simple and inexpensive chemicals and which is easily controlled.

Another object of the invention is to provide a process for preparing triphenylmethane dyes by a reaction which is induced by exposing suitable raw materials to the action of light of the proper wave length.

These and other objects will become apparent from the description which follows in which a preferred embodiment of my invention is described by way of illustration.

In its broadest aspects the present process for preparing triphenylmethane dyes comprises the irradiation with near ultraviolet light of an initially colorless composition containing (1) a secondary or tertiary arylamine and (2) a halogen compound containing at least three halogen atoms on a single carbon atom. The process may be carried out by exposing a solution of the two essential reactants to radiation of the proper wave length, e.g. from about 3500 A. to 5000 A. Preferably in order to achieve the maximum exposure, it is preferred that the reactants be in the form of a thin layer. One expedient which has been found to be particularly effective has been to apply a solution containing the arylamine and organic halogen compound to a porous substrate such as filter paper and exposing the same to the light, preferably after most of the solvent has been removed by evaporation. Other techniques for exposing a thin film of the reactants to the light may also be utilized. For example, a thin layer of liquid containing the arylamine and halogen compound may be maintained on a rotary drum, travelling past a source of light at a suitable rate.

After the reaction has proceeded, any unchanged amine and halogen compound are removed by extration of the exposed mixture with a hydrocarbon solvent and the dye is then extracted from the residue with hot methanol. The dye crystallizes from the alcohol, on cooling, and is then readily separable from the alcohol by filtration. The dye is purified by recrystallization from methanol.

The following example describes the preparation of Opal Blue SS, C.I. No. 42,760 which has the structure (I)
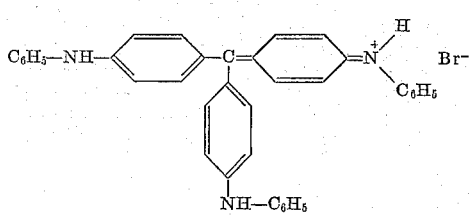

EXAMPLE

A solution was prepared consisting of 10 grams of diphenylamine and 20 grams of carbon tetrabromide in 100 cc. of acetone. The solution was added dropwise to a large piece of filter paper, the pores of which retained the liquid. The soaked filter paper was exposed to radiation from a 275 watt input General Electric reflector type sunlamp with a glass envelope for which the light output is tabulated in Table 1.

Table 1
LIGHT OUTPUT
[G.E. RS sunlamp 275 watt]

| Wave length (A.): | Radiated watts |
|---|---|
| 2652 | 0.004 |
| 2850 | 0.05 |
| 2967 | 0.13 |
| 3022 | 0.34 |
| 3131 | 0.88 |
| 3250 | 0.07 |
| 3341 | 0.16 |
| 3500 | 0.14 |
| 3654 | 2.51 |
| 3750 | 0.09 |
| 3900 | 0.14 |
| 4047 | 0.72 |
| 4200 | 0.09 |
| 4358 | 1.48 |
| 4916 | 0.30 |
| 5461 | 1.73 |
| 5500–7600 | 3.20 |

The exposure caused the pale straw-colored composition to turn deep blue, due to the formation of the dye Opal Blue SS having the formula given above.

The dye was extracted from the filter paper by hot alcohol and identified by elemental analysis and spectrophotometric tests.

While not wishing to be bound by any specific theory, the following is offered as one possible explanation of the mechanism of the reaction with $CBr_4$ and diphenylamine as the specific reaction ingredients, although a similar mechanism would appear to be applicable to other free radical-releasing compounds and other arylamines. The reaction is believed to proceed through a chain reaction involving splitting of the $CBr_4$ component by light absorption into free radicals, followed by production of other active radicals by interchange reactions as follows:

(1) $$CBr_4 + h\nu \rightarrow \cdot CBr_3 + Br\cdot$$

(2) 
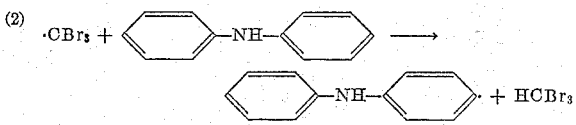

(3) 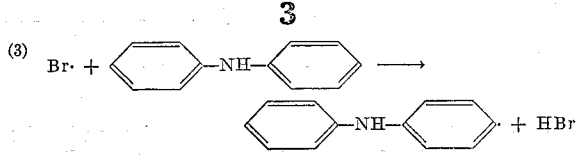

(4) 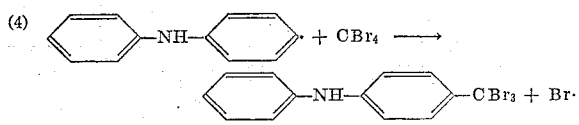

The bromine free radical resulting from reaction (4) might then react with another molecule of diphenylamine, as in reaction (3), thus assuring a continuing supply of diphenylamine radicals for further condensation. These may react with the product from reaction (4) as follows:

(5) 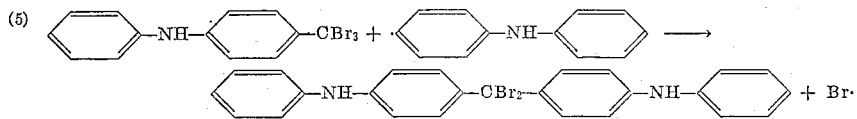

(6) 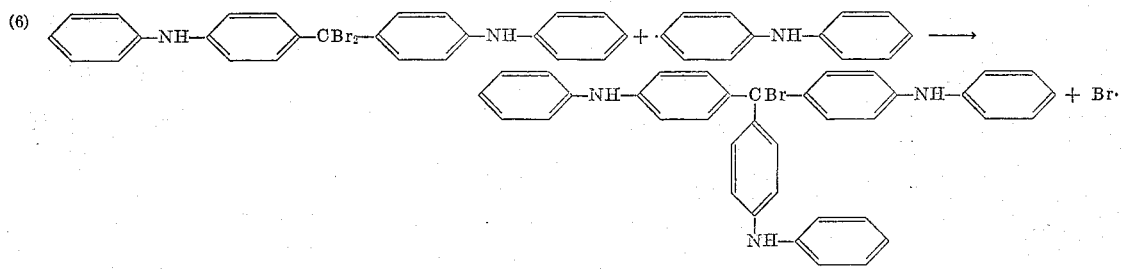

Steric hindrance would seem to make unlikely the continuation of this reaction sequence to the formation of a tetraphenylmethane derivative, and therefore the chain reaction probably continues through the alternative radical displacement route, leading to a triphenylmethyl radical, as follows:

(7) 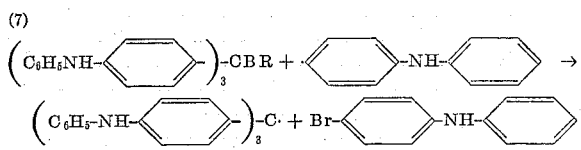

The trianilinotriphenylmethyl radical formed in reaction (7) may then react with a molecule of diphenylamine, giving trianilinotriphenylmethane and a diphenylamine radical, as shown in (8), or it may react with atmospheric oxygen to form the peroxy radical shown in (9):

(8) 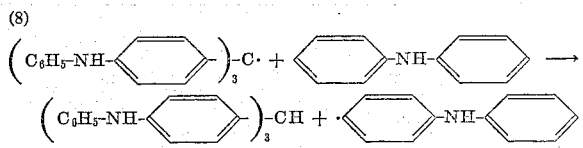

(9) 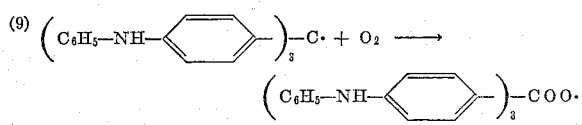

Peroxy radicals of the type of the product from reaction (9) are known to be very active oxidizing agents, and in this system may react with the product from (8), giving the carbinol of the triphenylmethane dye shown in (10) and at the same time regenerating the trianilinotriphenylmethyl radical needed to carry on the chain reaction:

(10) 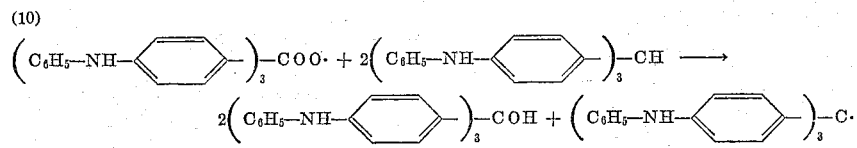

The carbinol (10) will immediately be converted to the deeply colored form of the triphenylmethane dye by the HBr which is present in the mixture from earlier steps in the chain reaction sequence:

(11) 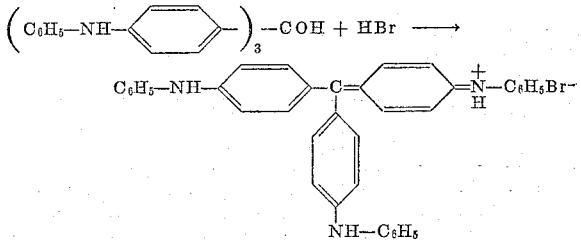

Regardless of whether this or some other reaction mechanism actually is representative of the process which occurs, it will be noted that the function of the carbon tetrabromide in the reaction is to provide the bridge carbon atom linking the three phenyl groups which form the dye skeleton. The position of attack is para to the activating anilino group.

Colorless, aromatic amines useful in this photo-production of triphenylmethane dyes are aryl amines, carbazoles and indoles represented by the following general formulas:

(I) 

Aryl amines wherein R represents a member selected from the group consisting of hydrogen, alkyl, aryl and aralkyl; $R_1$ represents a member selected from the group consisting of phenyl, α-naphthyl and β-naphthyl; and $R_2$ represents a member selected from the group consisting of alkyl, aryl and aralkyl groups.

Aryl amines illustrative of the above class include the follows:

Diphenylamine
N-methylaniline
N,N-dimethylaniline
N-ethylaniline
N,N-diethylaniline
Phenyl-α-naphthylamine
Phenyl-β-naphthylamine
Triphenylamine
N-methyldiphenylamine
N-benzylaniline
N,N-dibenzylaniline
N-benzyldiphenylamine
N-β-hydroxyethylaniline (II) 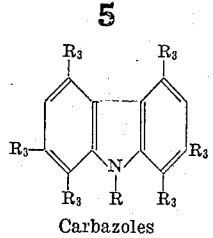

Carbazoles wherein $R_3$ each represents a member selected from the group consisting of hydrogen, alkyl, aryl, aralkyl, alkoxy, halogen and dialkylamino groups, and they may be the same or different and R represents a member selected from the group consisting of hydrogen, alkyl, aralkyl and aryl groups.

Illustrative carbazoles suitable for this invention include the following:

Carbazole
N-ethylcarbazole
N-methylcarbazole
N-phenylcarbazole
N-benzylcarbazole (III) 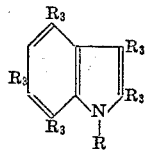

Indoles wherein R represents a member selected from the group consisting of hydrogen, alkyl, aralkyl and aryl groups and $R_3$ each represents a member selected from the group consisting of hydrogen, alkyl, aralkyl, alkoxy, halogen and dialkylamino groups.

Suitable indoles for the present invention include:

Indole
2-methylindole
1,2-dimethylindole
1-phenylindole
4-chloroindole

The halogen-containing materials useful in the present invention may be represented by the following general formula, $$R\text{---}CX_3$$

wherein R represents a member selected from the group consisting of hydrogen, halogen, alkyl, aralkyl and aryl, which may be substituted or unsubstituted, and each X represents a halogen atom, namely, chlorine, bromine and iodine and may be the same or differ from one another.

Other products obtained with diphenylamine as the amine and with the organic halogen compounds indicated below, in place of carbon tetrabromide, had the following colors:

| | |
|---|---|
| Bromotrichloromethane | Green. |
| Hexachloroethane | Blue. |
| Benzotribromide | Green. |
| Benzotrichloride | Blue-gray. |
| Carbon tetrachloride | Blue. |

Having now described my invention in accordance with the patent statutes, I claim:

1. A process for forming triphenylmethane dyes which comprises forming a mixture containing (1) a colorless arylamine represented by a formula selected from the group consisting of

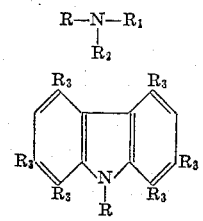

and

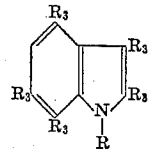

wherein: R represents a monovalent radical selected from the group consisting of hydrogen, alkyl, aralkyl and aryl; $R_1$ represents a member selected from the group consisting of phenyl, α-naphthyl and β-naphthyl; $R_2$ represents a member selected from the group consisting of alkyl, aryl and aralkyl; and each $R_3$ represents a member selected from the group consisting of hydrogen, alkyl, aryl, aralkyl, alkoxy, halogen and dialkyl amino; and may be the same or different; and (2) an organic halogen containing compound represented by the formula $$R\text{---}CX_3$$

wherein R represents a member selected from the group consisting of hydrogen, halogen, alkyl, aralkyl, aryl and substituted aryl, and each X represents a halogen atom selected from the group consisting of chlorine, bromine and iodine; exposing the mixture to radiation with light in the near-ultraviolet; thereby forming a triphenylmethane dye; and separately recovering the reaction product from the unreacted components of the reaction mixture.

2. The process of claim 1 wherein the amine is diphenylamine.

3. The process of claim I wherein the halogen compound is a halogenated methane having at least three halogens on the carbon.

4. The process of claim 3 wherein the halogen compound in $CBr_4$.

5. The process of claim 1 wherein the mixture is in solution.

6. The process of claim 1 wherein the mixture is in solution and the solution is applied to an absorbent inert support before exposure.

References Cited in the file of this patent

UNITED STATES PATENTS

| | | |
|---|---|---|
| 2,726,252 | Balon et al. | Dec. 6, 1952 |
| 2,855,303 | Chalkley | Oct. 7, 1958 |